No. 892,562. PATENTED JULY 7, 1908.
O. SPRISTER.
HORSESHOE CALK.
APPLICATION FILED FEB. 24, 1908.
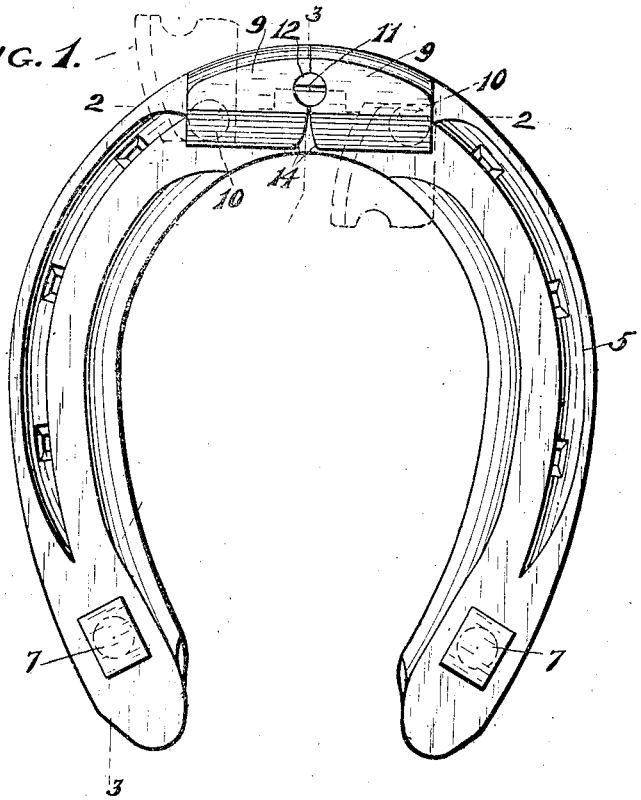
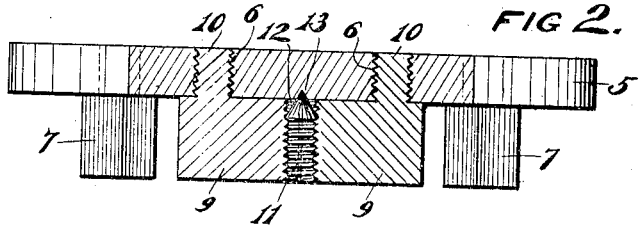
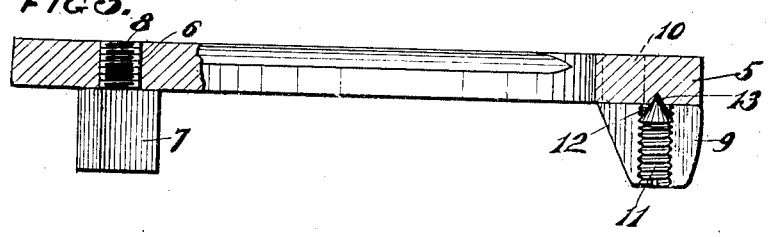
WITNESSES
INVENTOR.
Otto Sprister,
By Benedict, Morsell & Caldwell
ATTORNEYS.

UNITED STATES PATENT OFFICE.

OTTO SPRISTER, OF APPLETON, WISCONSIN.

HORSESHOE-CALK.

No. 892,562.   Specification of Letters Patent.   Patented July 7, 1908.

Application filed February 24, 1908. Serial No. 417,274.

*To all whom it may concern:*

Be it known that I, OTTO SPRISTER, residing in Appleton, in the county of Outagamie and State of Wisconsin, have invented new and useful Improvements in Horseshoe-Calks, of which the following is a description, reference being had to the accompanying drawings, which are a part of this specification.

This invention has for its object to provide a removable toe calk for horse shoes which is formed by a pair of independent calk members threading into the horse shoe with means for locking them together to constitute in effect a single broad toe calk.

With the above and other objects in view the invention consists in the horse shoe calks herein claimed and described and all equivalents.

Referring to the accompanying drawings in which like characters of reference indicate the same parts in the several views; Figure 1 is a plan view of a horse shoe provided with calks constructed in accordance with this invention; Fig. 2 is a sectional end view thereof on the plane of line 2—2 of Fig. 1; and, Fig. 3 is a sectional view thereof on the plane of line 3—3 of Fig. 1.

In these drawings 5 represents a horse shoe of ordinary construction provided with threaded openings 6 at the heel and toe portion to receive threaded calks, the heel calks 7 being simply blocks of hardened metal provided with screw stems 8 threading into the openings 6 at the heel portions of the horse shoe. The toe calks 9, however, are in the form of half sections of an ordinary broad toe calk, with threaded stems 10 near their ends turning into the threaded openings 6 at the toe portion of the horse shoe, said toe calks when screwed tightly into place, coming close together and preferably engaging each other at their front edges to form in effect a continuous single toe calk. A locking screw 11 is threaded in an opening 12 formed partly in each of the toe calks 9 and has a pointed conical end biting into a recess 13 in the toe of the horse shoe so that when it is tightly screwed into place it locks the toe calks against turning and consequently prevents their removal. The rear edges of the meeting ends of the toe calks are somewhat rounded as shown at 14 to permit their clearance when they are being turned into position, each being preferably turned to the position shown in dotted lines with only a quarter turn necessary to give it its final movement, and then the calk on the right of Fig. 1 being turned into its final position so that the calk on the left may be turned into its final position without binding owing to its rounded surface 14. Of course if it is more convenient the screw plugs 10 may be oppositely threaded so that one has a right hand thread and the other a left hand thread if desired, but it is found in practice that the two calks may be made to properly come together at their edges without binding when the screw stems 10 are made sufficiently below the middle of the calks with the stems 10 threaded alike.

The conical sharpened point of the locking screw 11 prevents the locking screw from engaging the threads of the opening 12 for a short distance from the horse shoe so that when the toe calks have worn to this point the remainder of the screw 11, which of course wears therewith, is left without a threaded engagement and consequently drops out of place, permitting the calks 9 to work loose and be detached so that new ones may be substituted therefor or the winter calks may be provided as above described.

The present invention is particularly designed for summer use, in winter it being the object to provide sharp calks to prevent slipping, and then screw plug calks similar to the heel calks 7 are substituted for the toe calks 9 as being less liable to slippage. During the summer, however, the broad toe calk is more desirable and the toe calks of the present invention are then employed, though if desirable these calks may be used at all times.

By means of this invention a toe calk of considerable length is rigidly though detachably secured to the horse shoe in a manner which renders it durable and efficient in its use and not liable to work loose or become lost.

What I claim as my invention is:

1. In combination with a horse shoe provided with threaded openings, a calk comprising calk sections having threaded stems engaging in the threaded openings of the horse shoe, and a locking screw located between the calk sections and threaded to each of them and engaging the horse shoe to prevent the calk sections from turning.

2. In combination with a horse shoe having threaded openings, a calk comprising calk sections provided with threaded stems engaging in the threaded openings of the horse shoe, said calks engaging each other end to end to form a continuous broad calk, said calks also being provided with recesses at their meeting edges forming a threaded opening between them, and a locking screw threaded in the threaded opening between the calk sections and provided with a pointed end, there being a recess in the horse shoe to receive the pointed end of the locking screw.

In testimony whereof, I affix my signature in presence of two witnesses.

OTTO SPRISTER.

Witnesses:
J. H. COOK,
F. J. ROONEY.